April 27, 1948.   F. O. HOSMER   2,440,337
PAY ROLL RECORD
Filed Feb. 15, 1946
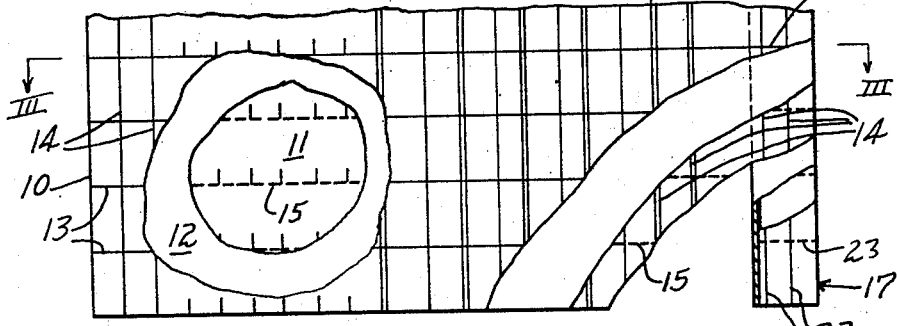
Fig. 1
Fig. 2
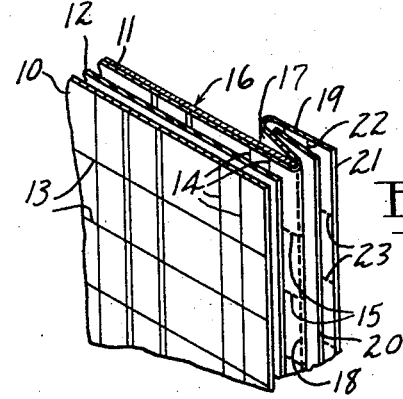
Fig. 3
INVENTOR.
FRAZIER O. HOSMER
BY
ATTORNEY Patented Apr. 27, 1948

2,440,337

UNITED STATES PATENT OFFICE 2,440,337

PAY ROLL RECORD

Frazier O. Hosmer, Birmingham, Ala.

Application February 15, 1946, Serial No. 647,977

5 Claims. (Cl. 282—3)

This invention relates to a payroll record and has for an object the provision of such a record which will minimize errors, and provide identical data, identically arranged, for both the employer and the employe.

A further object of my invention is to provide a payroll record by means of which duplicate records are made, one copy of which is adapted for attachment to a pay envelope having identifying headings corresponding to those of the other copy.

A more specific object of my invention is to provide a payroll record which shall include an original sheet ruled horizontally to provide a record of a plurality of employes, and vertically to provide spaces for a time record, wages earned, and deductions for each employe, with appropriate headings for each vertical column; also a duplicate record without headings and adapted for separation along horizontal lines and attachment of the duplicate separate records thus formed to pay envelopes or checks which are ruled vertically and have headings corresponding to those of the original.

A still further object of my invention is to provide a payroll record which provides identical data, identically arranged for the employer and the employe together with a detachable receipt tab for the signature of the employe when he is paid.

Heretofore in making up payrolls and pay envelopes or checks it has been the practice to make a statement separate from the pay envelope, which is given to the employe and in addition the amount of pay is written on the envelope. This making of multiple records increases the labor required in making up payrolls and multiplies the possibility of error. In accordance with my invention, I obviate these difficulties by providing superposed original and duplicate records with an interposed carbon sheet, both of which are divided by vertical lines into columns with suitable headings for entry of the usual payroll data. Horizontal lines provides spaces for the records of a plurality of employes. The duplicate record is divided by perforated horizontal parting lines whereby it may be separated into a plurality of individual records. A pay record such as an envelope or pay check stub is also provided having a marginal edge ruled to correspond with the vertical lines on the original whereby a detached individual record may be attached to the pay record with columns on the payroll record alongside their appropriate headings on the pay record or check stub. In addition, I provide a flap along one marginal edge of the duplicate which may be folded over the main portion thereof and then once again upon itself so that a carbon copy of the amount entered on the original may be impressed on the flap. When the flap is unfolded and the duplicate record carrying the same is detached from the payroll record and attached to the pay envelope or check stub, the flap forms a detachable tab for signature receipt by the employe.

A record embodying features of my invention is illustrated in the accompanying drawings, forming a part of this application, in which Fig. 1 is a front view with the sheets broken away in parts to illustrate the assembly;

Fig. 2 is a similar view showing a pay envelope with a detached individual duplicate record attached thereto; and Fig. 3 is a fragmentary perspective view taken along line III—III of Fig. 1 and showing the relative arrangement of the original sheet, duplicate sheet, and the signature flap alongside the duplicate sheet.

Referring now to the drawings for a better understanding of my invention, my improved payroll record comprises an original sheet 10 and a duplicate sheet 11 with a carbon sheet 12 interposed therebetween, though it will be obvious to those skilled in the art that carbon coating may be placed on the back side of the original. The sheets are preferably secured together by gluing or otherwise along one edge, either at the top or at one side, so as to hold them in proper superposed position. Both the original sheet 10 and the duplicate sheet 11 are provided with horizontal lines 13 and vertical lines 14 which divide them into vertical columns with horizontal guide lines for entering payroll data with respect to a plurality of employes. For example, the headings may show the employe's number, the number of his dependents, the record of employment showing hours worked each day of the week, with a summary of the total hours, the rate paid, the wages earned, the deductions from his pay, and the final balance in the extreme right hand column.

It will be understood, of course, that the headings are shown by way of example only that other arrangements may be more appropriate for conditions other than those here visualized. The horizontal lines 13 on the duplicate record 11 are perforated as indicated at 15, whereby the separate record for each employee may be separated from the duplicate. The back of the duplicate record 11 is provided with an adhesive coating 16 whereby the separate detached record may be secured to a pay record as hereafter described.

Along the right hand edge of the duplicate record 11, a detachable flap 17 is secured to the body of the duplicate record along a perforated line 18. The flap 17 is folded over once upon itself as shown at 19 so that its right hand edge 21 coincides with the right hand edge of the duplicate record 11. The fold 19 is provided with vertical lines 22 and horizontal lines and perforations 23 which lie directly under the horizontal lines 13 on the duplicate. Thus when an entry is made in the extreme right hand column of the original record showing the balance due an employe, a copy is made on the duplicate 11 and on the fold 19, it being understood that a strip of carbon paper 20 is interposed between the folds of the flap. The flap 17 is provided with a receipt heading and forms a space for the signature of an employe when he is paid.

In Fig. 2 of the drawing, I show, by way of example, a pay record comprising an envelope which is ruled along one marginal edge with lines corresponding to the vertical lines on the original record and which is provided with headings in the columns thus formed corresponding to the headings on the original record. Thus when a duplicate individual record of an employe is separated as hereinbefore described, it is pasted on the pay envelope with the entries under the appropriate headings thereby giving to the employe his duplicate record of that kept by the employer on the original. Also, when the duplicate is pasted on the pay envelope as shown, the tab formed by separating the individual record along the horizontal lines 23 of the flap, extends over the end of the envelope to form a detachable receipt which the employe may sign, when receiving the envelope, and thereafter be retained by the employer.

It is contemplated that in using my improved pay roll record, the names of the several employes entered thereon will be maintained in their same relative positions on the original from pay period to pay period. By thus employing the records, accumulated data may be readily taken from a plurality of records by placing them in overlapping relation, by folding along vertical lines to the selected columns, by employing a ruler in a manner well known to select the data from selected columns, or by any other of the well known devices employed by accountants in taking off data from a plurality of records. The payroll record illustrated is shown as a weekly record but the same may be employed for a bi-weekly record in which case the record of each employe would occupy two horizontal lines instead of one. By suitable modification which will be obvious, it may be adapted for any pay period.

Instead of the pay record in the form of an envelope as shown in Fig. 2, it will be obvious that the same may be in the form of a check with a detachable portion ruled and with appropriate headings as in Fig. 2. With such an arrangement, the ruled portion of the check would be detachable from the main body when the employe is paid.

From the foregoing it will be apparent that I have devised an improved payroll record which is simple of design, which minimizes the possibilities of errors, and which gives to an employe a record identical with that kept by the employer.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. A pay roll record comprising original and duplicate sheets each having horizontal and vertical parallel lines which divide them into corresponding columns for the entry of pay roll data for a plurality of employes, a carbon sheet between the original and the duplicate, identifying headings at the tops of the columns on the original sheet, a detachable flap along one marginal edge of the duplicate folded over the back of the duplicate and then over against itself and having vertical lines thereon forming columns which lie directly under the marginal lines on the duplicate, a carbon strip wihin the folds of the flap, the flap being joined to the marginal edge of the duplicate along a perforated line, pay roll envelopes each having ruled lines along one margin corresponding to the vertical lines on the sheets and having identifying data associated with the lines corresponding to those on the original, horizontal perforated parting lines on the duplicate and extending across the flap for separating the duplicate and the flap into a plurality of separate records, and adhesive on the back of the duplicate for attaching the separate records formed by separation from the duplicate to the envelopes with tabs formed by separating the flap overhanging one end of the envelope.

2. A pay roll record comprising original and duplicate sheets each having horizontal and vertical parallel lines which divide them into corresponding columns for the entry of pay roll data for a plurality of employees, a carbon sheet between the original and duplicate, identifying headings at the tops of the columns on the original sheet, a detachable flap along one marginal edge of the duplicate folded over the duplicate and then over against itself and having vertical lines thereon forming columns which lie directly under the marginal lines on the duplicate, a carbon strip within the folds of the flap, the flap being joined to the marginal edge of the duplicate along a perforated line, pay roll envelopes each having ruled lines along one margin corresponding to the vertical lines on the sheets and having identifying data associated with the lines corresponding to those on the original, horizontal parting lines on the duplicate and extending across the flap for separating the duplicate and the flap into a plurality of separate records for attachment to the envelopes with tabs formed by separating the flap overhanging one end of the envelope.

3. A pay roll record comprising original and duplicate sheets each having horizontal and vertical parallel lines which divide them into corresponding columns for the entry of pay roll data for a plurality of employes, a carbon sheet between the original and the duplicate, identifying headings at the tops of the columns on the original sheet, a detachable flap along one marginal edge of the duplicate folded over the duplicate and then over against itself and having vertical lines thereon forming columns which lie directly under the marginal lines on the duplicate, a carbon strip within the folds of the flap, the flap being joined to the marginal edge of the duplicate along a perforated line, individual pay records each having ruled lines extending thereacross corresponding to the vertical lines on the sheet and having identifying data associated with the lines corresponding to those on the original, horizontal perforated parting lines on the duplicate and extending across the flap for separating the duplicate into a plurality of separate records for attachment to the individual pay records with a tab formed by separating the flap overhanging one end of the individual pay record.

4. A pay roll record comprising original and duplicate sheets each having horizontal and vertical parallel lines which divide them into corresponding columns for the entry of pay roll data for a plurality of employes, a carbon sheet between the original and the duplicate, identifying headings at the tops of the columns on the original sheet, a detachable flap along one marginal edge of the duplicate folded over the duplicate and then over against itself and having vertical lines thereon forming columns which lie directly under the marginal lines on the duplicate, a carbon strip within the folds of the flap, the flap being joined to the marginal edge of the duplicate along a perforated line, individual pay records each having ruled lines extending thereacross corresponding to the vertical lines on the sheet and having identifying data associated with the lines corresponding to those on the original, horizontal perforated parting lines on the duplicate and extending across the flap for separating the duplicate into a plurality of separate records for attachment to the individual pay record with a tab formed by separating the flap overhanging one end of the individual pay record, there being a weakened parting line between the tab and the rest of the individual pay record.

5. A pay roll record comprising an employer's sheet and an employe's sheet each having horizontal and vertical parallel lines which divide them into corresponding columns for the entry of pay roll data for a plurality of employes, a carbon sheet between the employe's and employer's sheets, identifying headings at the top of the columns on the employer's sheet, a detachable flap joined along one marginal edge of the employe's sheet providing a continuation of the horizontal columns thereof, said flap being folded with respect to the employe's sheet to lie directly in alignment with the horizontal columns of the employe's sheet, a carbon sheet associated with the flap, individual pay records each having ruled lines thereon corresponding to the vertical lines of the employe's sheet and having identifying headings associated with the lines corresponding to those on the employer's sheet, and horizontal parting lines on the employe's sheet for separating the same and the flap into a plurality of separate records for attachment to the individual pay record, tabs being formed at one end of each separate record by separating the flap, said tabs being separable from the remainder of the pay record.

FRAZIER O. HOSMER.

REFERENCES CITED

The following references are of record in the file of this patent:

UNITED STATES PATENTS

| Number | Name | Date |
| --- | --- | --- |
| 2,323,586 | Dienna | July 6, 1943 |

FOREIGN PATENTS

| Number | Country | Date |
| --- | --- | --- |
| 458,971 | Great Britain | Dec. 30, 1936 |